INVENTOR
LEON BESS

น
2,948,854

PULSE DECODER HAVING PULSE WIDTH AND PULSE SPACING DISCRIMINATING MEANS

Leon Bess, Boston, Mass., assignor, by mesne assignments, to the United States of America as represented by the Secretary of the Navy Filed Sept. 17, 1945, Ser. No. 616,918

9 Claims. (Cl. 328—56)

This invention relates to decoding systems, and more particularly to a decoding system for converting a series of code pulses of electrical energy of a predetermined width or time duration delayed from one another by predetermined time intervals or spacings into a single pulse which conveys the original data transmitted.

There have been developed in the past various radiant energy identification systems employing electromagnetic energy pulse transmission. These systems comprise interrogator-responsor units, containing transmitting and receiving components, which transmit interrogating radiant energy pulses to remote transponder units that also contain receiving and transmitting components and are responsive to the interrogating radiant energy pulses. This response is of the nature of identifying radiant energy signals which are transmitted back to and received by the interrogator-responsor units to provide the necessary identification. Such a system above-mentioned is disclosed in patent application Serial No. 542,287, filed June 27, 1944, by Luis W. Alvarez for a "Communication System," now Patent No. 2,480,208. However, it has been found advantageous from the standpoint of military security to use transponders which are responsive only to a properly coded transmission so that identification signals will be transmitted only in reply to interrogator-responsors with the proper coded interrogating transmission.

In addition there have also been developed in the art various radiant energy echo ranging systems employing electromagnetic energy pulse transmission. Recent developments in this field have included such radiant energy echo ranging devices carried aboard an aircraft, the information received by the aircraft from these devices being conveyed by supplementary relaying means to a ship or land station in order to increase the detection range of the ship or land station. Such a pulsed echo ranging device and relaying system is described more fully in patent application Serial Number 592,794 for a "synchronizer for Indicators" filed May 9, 1945, now Patent No. 2,698,931, by Stanley N. Van Voorhis. In relaying such pulsed information it is again important that military security be preserved and also that there be no confusion as a result of interference from a spurious source, such as atmospheric noise or other echo ranging systems. To achieve these desired results, there have been invented various systems for coding the electromagnetic pulses transmitted by the above-mentioned relaying means, the details of one of such systems being disclosed in a copending application for a "Coded Data Transmission System," Serial No. 617,151, filed September 18, 1945, now Patent No. 2,706,810 by Andrew B. Jacobsen.

As a solution of the above-mentioned problems, various decoders have been devised in the art to decode a series or set of code pulses of electrical energy separated or delayed from one another by predetermined time intervals or spacings, but up to the present none would distinguish between pulses of slightly different widths or time durations. A decoder designed to operate with two microsecond pulses would operate equally well with input pulses of one or three microseconds duration as long as the proper time delay between pulses was maintained.

Accordingly, one object of this invention is to provide a decoder or circuit which can be incorporated in a transponder or a supplementary relaying means receiver associated with an echo ranging system to make the transponder or receiver responsive only to sets or series of radiant energy coded pulses of predetermined characteristics.

Another object is to provide such a decoder or circuit which is able to discriminate between coded pulses separated or delayed from one another by predetermined time intervals or spacings and those of different time intervals or spacings.

Another object is to provide such a decoder or circuit which is able to discriminate between coded pulses of one predetermined width or time duration and those of different widths or time durations.

Still another object is to provide a means for decoding a set or series of code pulses of electrical energy of a predetermined width or time duration separated or delayed from one another by predetermined time intervals or spacings into a single pulse.

Other and further objects will appear in the course of the following description when taken with the accompanying drawings in which.

Figure 1:
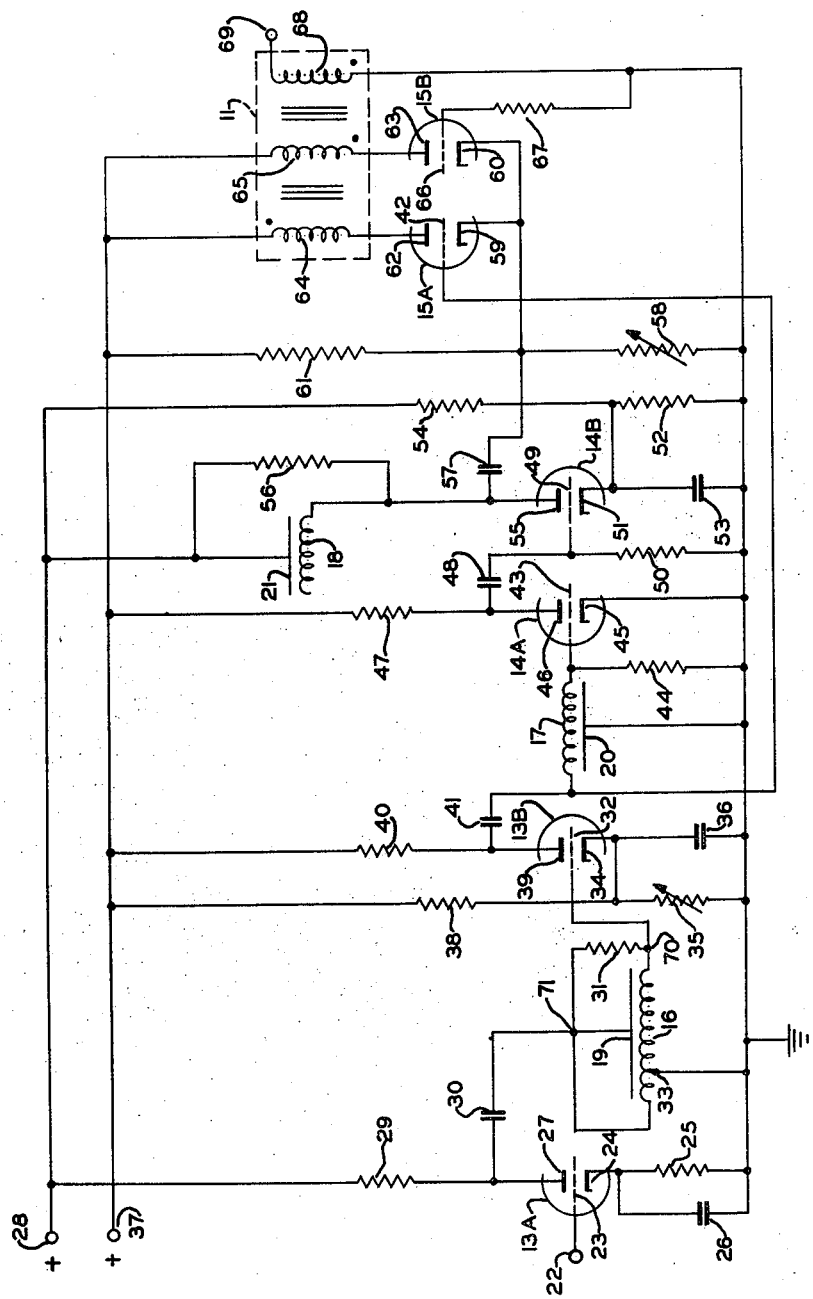
Fig. 1 illustrates one embodiment of this invention.

In Fig. 1 is shown a circuit including a two primary pulse transformer 11, three twin-triode vacuum tubes 13, 14, and 15, each having two cathodes, two grids, and two plates, and three artificial delay lines 16, 17, and 18. The two halves of each twin-triod vacuum tube have been distinguished in Fig. 1 by the use of the letter "A" or "B" appended to the proper reference figure. Tube cathode heaters and heater circuits, being well-known to those skilled in the art, have been omitted for the same of simplification of the circuit diagram. Physically, each delay line 16, 17, and 18 is composed of a thin inductive coil surrounded by a cylindrical outer conductor which is represented in Fig. 1 by straight lines 19, 20, and 21 parallel to the respective coil symbols. The input to the decoding system is connected to terminal 22, which is also connected to grid 23 of tube 13A. Cathode 24 is connected to ground through cathode resistor 25 and cathode condenser 26 in parallel as shown, and plate 27 is connected to terminal 28 through plate resistor 29. To termnial 28 is connected a suitable source of positive plate voltage, and to plate 27 is also connected one terminal of coupling condenser 30, whose other terminal is connected to one end of delay line 16, outer conductor 19, and one end of resistor 31 at junction point 71. The other end of delay line 16 is connected to the other end of resistor 31 and to grid 32 of tube 13B at junction point 70. The impedance of resistor 31 is made equal to the characteristic impedance of delay line 16 in order to prevent reflections. Tap 33, whose location on delay line 16 is determined by the width or time duration of the pulses to be decoded, is grounded. Cathode 34 of tube 13B is connected to ground through cathode resistor 35 and cathode condenser 36 in parallel as shown and to terminal 37 through resistor 38. To terminal 37 is also connected a second source of positive potential whose magnitude is less than that connected to terminal 28. Plate 39 of tube 13B is connected to terminal 37 through plate resistor 40 and to one terminal of coupling condenser 41, whose other terminal is connected to one end of delay line 17 and grid 42 of tube 15A. The other end of delay line 17 is connected to grid 43 of tube 14A and to one end of grid resistor 44, whose other end is grounded, as is outer conductor 20 of delay line 17 and cathode 45 of tube 14A. The impedance of resistor 44 is made equal to the characteristic impedance of delay line 17 in order to prevent reflections. Plate 46 is connected to terminal 37 through plate resistor 47 and to one terminal of coupling condenser 48, whose other terminal is connected to grid 49 of tube 14B and to ground through grid resistor 50. Cathode 51 of tube 14B is connected to ground through cathode resistor 52 and cathode condenser 53 in parallel as shown and to terminal 28 through resistor 54. Plate 55 is connected to one end of delay line 18, to one end of resistor 56, and to one terminal of coupling condenser 57. The other end of resistor 56 is connected to terminal 28 and to outer conductor 21 of delay line 18. The other end of delay line 18 is open-circuited. The impedance of resistor 56 is made approximately 1.6 times the characteristic impedance of delay line 18 in order to prevent reflections and to compensate for the attenuation of the line. The other terminal of coupling condenser 57 is connected to ground through cathode resistor 58, to cathode 59 of tube 15A, to cathode 60 of tube 15B, and to terminal 37 through resistor 61. Cathode resistors 35 and 58 are both made variable to facilitate tube bias adjustments. Plates 62 and 63 of tubes 15A and 15B respectively are connected to terminal 37 through primaries 64 and 65 respectively of pulse transformer 11, and grid 66 of tube 15B is connected to ground through grid resistor 67. One end of secondary 68 of pulse transformer 11 is grounded and the other end is connected to terminal 69, which is the output of the decoding system.

In this decoding system, tube 13A acts as a driver, delay line 16 and tube 13B as a pulse width discriminator circuit, tube 14A as a limiter-inverter, tube 14B as an inverter-driver, and pulse transformer 11 and tubes 15A and 15B as a push-pull coincidence circuit. The circuits including tubes 14A, 14B, 15A, and 15B and pulse transformer 11 further constitute a decoder. This coincidence circuit above-mentioned is disclosed and claimed in copending application Serial No. 617,372, filed September 19, 1945, for a "Push-Pull Coincidence Circuit," now Patent No. 2,538,500. For the purposes of this disclosure, the following brief description of the circuit is deemed sufficient. As shown by the dots at the ends of coil 64, 65, and 68 of pulse transformer 11, primary coils 64 and 65 are wound in opposition to one another, as are primary coil 64 and secondary coil 68. The D.C. impedance of resistor 67 is made equal to that of resistor 44 so that grids 42 and 66 are both biased similarly above ground. Therefore tubes 15A and 15B, having a common cathode resistor 58 also, are symmetrical and when a negative pulse is applied to both their cathodes 59 and 60 simultaneously, both tubes are turned on and draw equal amounts of plate current. Since coils 64 and 65 are wound in phase opposition, these equal currents will produce no voltage output across secondary coil 68, but will place both tubes in the high transconductance region of their operating characteristics. Then when a separate negative pulse is simultaneously applied to the grid of only one tube, as to grid 42 of tube 15A, a similarly pulsed voltage output will appear across secondary coil 68 whose magnitude is relatively great due to the tube being operated in the high transconductance region of its characteristic. This pulse width discriminator circuit above-mentioned is disclosed and claimed in copending application Serial No. 616,919, filed September 17, 1945, for a "Pulse Width Discriminator," now Patent No. 2,677,760. Its operation will be described hereafter in this specification.

Figure 2:
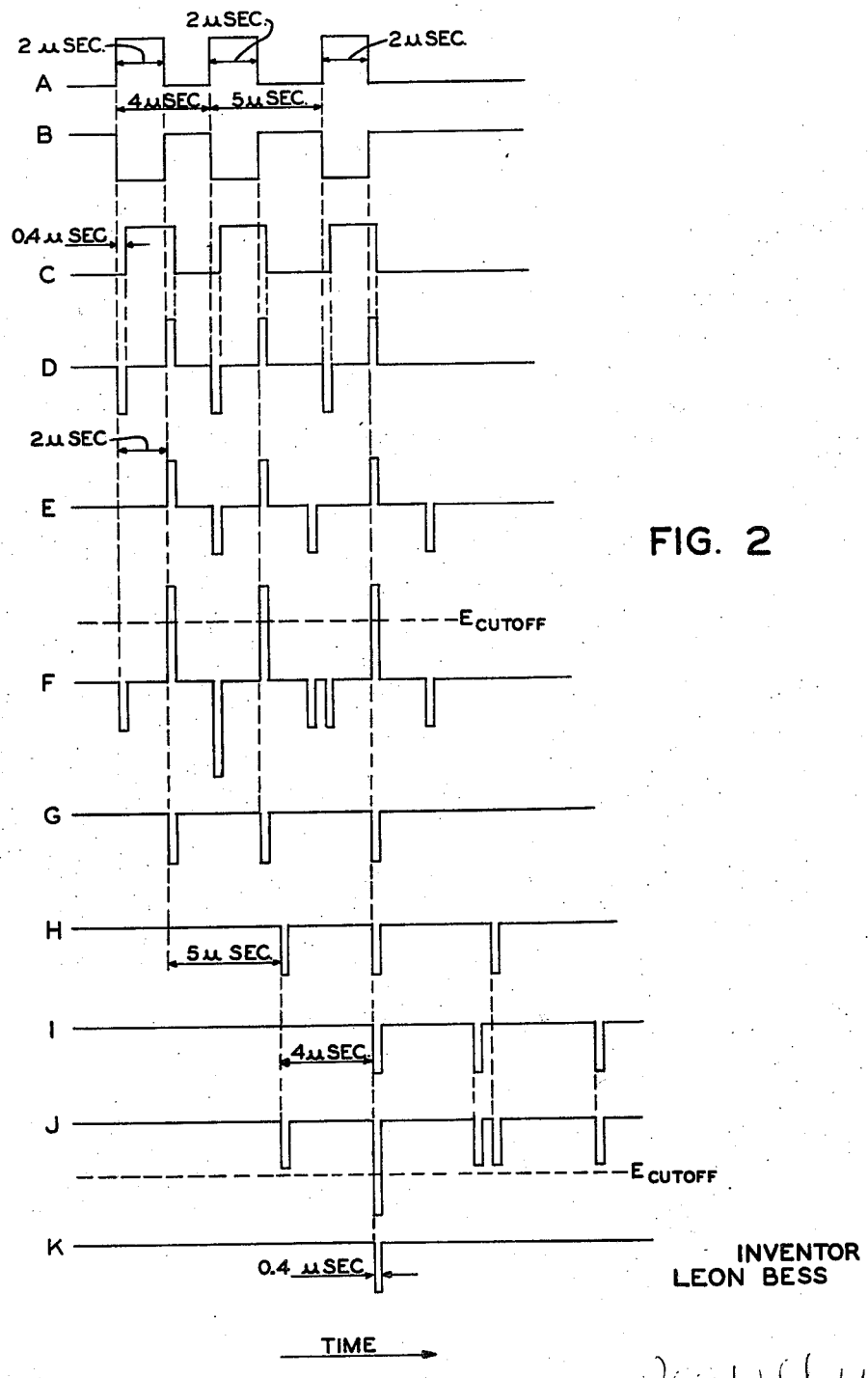
Fig. 2 shows the waveforms associated with the embodiment of Fig. 1, plotted as a function of time.

Referring now to Fig. 2 also, assume that a series of three positive code voltage pulses, each of two microseconds' duration, the second delayed four microseconds after the first and the third five microseconds after the second as shown in line A of Fig. 2 is applied to input terminal 22 of Fig. 1. Further assume that delay line 16 is so constructed as to give a two microsecond delay between tap 33 and its end connected to junction point 70 and a two-tenths microsecond delay between tap 33 and its other end, that delay line 17 is so constructed as to give a total delay of five microseconds, and that delay line 18 is so constructed as to give a total delay of two microseconds. The output at plate 27 from driver tube 13A will be as shown in line B of Fig. 2, the pulses now being negative due to the inversion action of the tube, and being impressed on the 0.2 microsecond section of delay line 16 through coupling condenser 30, will be reflected back inverted and delayed by 0.4 microsecond as shown in line C since this section of line is grounded at its other end. The result at junction point 71 will be as shown in line D, which is the sum of the waveforms shown in lines B and C. This series of voltage pulses at junction point 71 are represented by the waveforms of line D.

The grid to ground potential of tube 13B, in the following explanation, has been designated as $V_g$.

(a) $\qquad V_g = V_{(71-33)} + V_{(70-71)}$ where $V_{(71-33)}$ is the potential across the junction point 71 and ground, represented by the waveform of line D, and $V_{(70-71)}$ is the potential across the terminating resistor 31. Now since (b) $\qquad V_{(71-70)} = -V_{(70-71)}$ and (c) $\qquad V_{(71-70)} = V_{(71-33)}$ delayed two microseconds then (d) $\qquad V_{(70-71)} = -V_{(71-33)}$ delayed two microseconds Therefore, (e) $V_g = V_{(71-33)} + [-V_{(71-33)}$ delayed two microseconds]

The line E of Fig. 2 represents the waveform of $V_{(70-71)}$ which is the waveform of line D inverted and delayed two microseconds (Equations c and d). Line F, which is the addition of the waveforms of lines D and E, represents the waveform of the grid to ground potential of tube 13B (Equation e).

Cathode resistor 35 of tube 13B is adjusted so that this tube is normally off. As illustrated, at three separate times the pulses shown in lines D and E occur at the same instant, so that as shown in line F at these three times instant, pulses are present at junction point 70 of sufficient magnitude to drive grid 32 of tube 13B above cutoff, turning this tube on and producing voltage pulses represented by line G at its plate 39. These pulses are applied to grid 42 of coincidence tube 15A and to the input of delay line 17, appearing five microseconds later at grid 43 of tube 14A. This tube is normally on and acts as a limiter, being turned off by any small negative pulse applied to its grid since its cathode is connected to ground. This is to insure that the output of this tube will always be constant regardless of the variation of the cathode bias on tube 13B and the attendant variation of the magnitudes of the input pulses applied to grid 43. The output at plate 46 of tube 14A is applied to grid 49 of tube 14B where it is amplified and inverted again and then applied to cathodes 59 and 60 and to delay line 18. These pulses are represented by the waveforms in line H. Since delay line 18 is open-circuited at its other end and since it has a resistance whose impedance is equal to approximately 1.6 times its characteristic impedance connected between its input end and shield, four microseconds later a set of voltage pulses similar to those applied will appear at its input and hence also at cathodes 59 and 60. These are represented by line I and the resultant of the pulses represented by the waveforms shown in lines H and I is shown in line J. As shown, at one instant of time one pulse shown in line H and one shown in line I combine to form a large negative pulse sufficient to drive tubes 15A and 15B beyond cutoff and to cause plate current to flow in both tubes. The cutoff point of these tubes is of course adjusted by means of variable cathode resistor 58. Since the third pulse shown in line G is applied to grid 42 at this same time as previously described, an output will occur at terminal 69 as above-mentioned in the discussion of the coincidence circuit and as represented by the waveform of line K. Tests have shown that this circuit will not pass pulses whose widths exceed the predetermined pulse width by more than one-fourth microsecond and the same limits apply to the predetermined delays between pulses.

The selectivity of the present system is governed to a certain extent by the position chosen for grounded point 33 on delay line 16, which point determines the time delay between pulse trains B and C in Fig. 2 and, consequently, the width of the finite control pulses present in lines D through K of the same figure. The width of these pulses is of controlling significance because both the pulse width and pulse spacing discriminating circuits of Fig. 1 require at least double amplitude signals for their operation. Referring to Fig. 2, it is obvious that as the pulse width departs from its proper value, 2 μ-seconds, the positive pulses in line D, representing the leading edges, will move either to the right or left, depending upon the direction of variance, with respect to the positive pulses in line E, defining the trailing edges, until a point is reached where these pulses will just miss coinciding to give the double amplitude signals of line F. This point fixes the maximum and minimum pulse widths that can activate the receiver and determines, as a consequence, the selectivity of this phase of the system. By resorting to a similar analysis, it can be shown that the same conditions determine the sensitivity of the pulse spacing discriminator. Consequently, the sensitivity of the system as a whole can be increased or decreased by varying the location of point 33 on delay line 19 so as to change the width of the finite control pulses.

It is to be understood that while the operation of the above embodiment of this invention has been described with reference to a single series of pulses, the embodiment is operable with a plurality of successive series. Further, while a specific embodiment has been described as required by the patent statutes, the principles of this invention are of much broader scope. Numerous additional specific applications, as, for example, employing multivibrators for obtaining delay as a substitute for delay lines, will occur to those skilled in the art and no attempt has been made to exhaust such possibilities. The scope of the invention is defined in the following claims.

What is claimed is:

1. In a decoding system, a decoder comprising two delay lines, a limiter-inverter circuit, an inverter-driver circuit, a coincidence circuit, means for impressing a series of code pulses on one input of said coincidence circuit and on the input of the first of said delay lines, means for connecting the output of said first delay line to the input of said limiter-inverter circuit, means for connecting the output of said limiter-inverter circuit to the input of said inverter-driver circuit, means for connecting the output of said inverter-driver circuit to a second input of said coincidence circuit and to the input of the second of said delay lines, means for connecting the output of said second delay line to said second input of said coincidence circuit, and means for abstracting the output of said coincidence circuit.

2. In a decoding system, means for passing pulses of electrical energy of a predetermined time duration and excluding pulses of other time durations independent of the delay between pulses, and means for converting the pulses so passed into a single pulse comprising, two delay lines, a limiter-inverter circuit, an inverter-driver circuit, a coincidence circuit, means for impressing the pulses so passed on one input of said coincidence circuit and on the input of the first of said delay lines, means for connecting the output of said first delay line to the input of said limiter-inverter circuit, means for connecting the output of said limiter-inverter circuit to the input of said inverter-driver circuit, means for connecting the output of said inverter-driver circuit to a second input of said coincidence circuit and to the input of the second of said delay lines, means for connecting the output of said second delay line to said second input of said coincidence circuit, and means for abstracting the output of said coincidence circuit.

3. In a decoding system, means for passing pulses of electrical energy of a predetermined time duration and excluding pulses of other time durations independent of the delay between pulses, means for delaying by a predetermined time interval the pulses so passed, means for delaying the delayed pulses by a second predetermined time interval, means responsive to the combination of said delayed pulses, said twice delayed pulses, and said passed pulses for providing a single pulse at the output thereof only when said passed pulses are of a predetermined number spaced from one another by predetermined time intervals.

4. In a decoding system, means for passing pulses of electrical energy of a predetermined time duration and excluding pulses of other time durations independent of the delay between pulses, means responsive to said pulses for delaying said pulses by a first predetermined time interval, said delaying means comprising output terminals whereat said delayed pulses appear, second delaying means having input and output terminals responsive to said delayed pulses for delaying said delayed pulses by a second predetermined interval, means comprising input and output terminals responsive to the application at the input terminals thereof of the combination of said passed pulses, said passed pulses delayed by a first predetermined time interval and said passed delayed pulses delayed by a second predetermined time interval, for producing at the output terminals thereof a single pulse only when said passed pulses are of a predetermined number and spaced from one another by predetermined time intervals.

5. Apparatus of claim 4 wherein said predetermined number of passed pulses is three and the predetermined time interval between the first and second pulse is equal to said second predetermined time interval and the time interval between the second and third pulses is equal to said second predetermined time interval.

6. A decoding system comprising in combination, a pulse width discriminator circuit for producing a constant amplitude control pulse for each pulse of predetermined duration in a signal train, means for successively delaying said control pulses by first and second time intervals, means for combining said control pulses delayed by said first time interval with said control pulses delayed by both said first and second time intervals whereby double amplitude signals are obtained whenever the separation between first and second adjacent control pulses corresponds to said second time interval, and means for applying said double amplitude signals and said original control pulses to a coincidence circuit whereby a single coded output signal is produced whenever the separation between said second control pulses and adjacent third control pulses corresponds to said first time interval.

7. A decoding system comprising in combination, means for deriving control pulses representing the leading and trailing edges of individual pulses in a signal train, means for delaying said control pulses a predetermined time interval, means for combining said original control pulses with said delayed pulses whereby double amplitude signals are obtained for each pulse in the signal train having a duration equal to said predetermined time interval, said double amplitude pulses being formed by the superpositioning of adjacent control pulses corresponding to the leading and trailing edges, respectively, of individual pulses in said train, means for passing said double amplitude pulses while suppressing said control pulses, and means for feeding said pulses so passed to a coincidence circuit whereby a single output pulse is generated whenever successive passed pulses occur in a predetermined time sequence.

8. A decoding system comprising in combination, means for deriving control pulses representing the leading and trailing edges of individual pulses in a signal train, means for delaying said control pulses a predetermined time interval, means for combining said original control pulses with said delayed pulses whereby a double amplitude signal is produced for each pulse in the signal train having a duration substantially equal to said predetermined time interval, said double amplitude signal being formed by the superpositioning of adjacent control pulses corresponding to the leading and trailing edges of the individual pulses in said signal train, means for passing said double amplitude signals while suppressing said control pulses, means for successively delaying said passed pulses by second and third time intervals, means for combining pulses delayed by said second time interval with pulses delayed by both said second and third time intervals whereby second double amplitude signals are produced whenever adjacent passed pulses have a separation equal to said third time interval, and means responsive to the conjoint presence of second double amplitude signals and undelayed passed pulses for producing a single coded output pulse.

9. A decoding system comprising in combination, means for receiving a signal train of individual pulses, means for delaying and inverting said pulse train to produce a second pulse train, means for combining said original pulse train and said second pulse train whereby constant amplitude control pulses representing the leading and trailing edges of the individual pulses in said received pulse train are obtained, means for delaying said control pulses by a predetermined time interval, means for combining said delayed control pulses with said originally produced control pulses whereby a double amplitude signal is obtained for each pulse in the incoming signal train having a duration equal to said predetermined time interval, means for passing said double amplitude pulses while suppressing said control pulses, said pulses so passed being fed to a coincidence circuit whereby a single output pulse is generated whenever successive passed pulses occur in a predetermined time sequence.

References Cited in the file of this patent

UNITED STATES PATENTS

| | | |
|---|---|---|
| 1,645,563 | Whistlecroft | Oct. 18, 1927 |
| 2,403,561 | Smith | July 9, 1946 |
| 2,406,834 | Hartley | Sept. 3, 1946 |
| 2,444,741 | Loughlin | July 6, 1948 |
| 2,446,943 | McGoffin | Aug. 10, 1948 |
| 2,489,297 | Labin | Nov. 29, 1949 |
| 2,549,776 | Cleeton | Apr. 24, 1951 |

FOREIGN PATENTS

| | | |
|---|---|---|
| 528,192 | Great Britain | Oct. 24, 1940 |